VIDEO AMPLIFIER TRANSIENT RESPONSE CONTROL CIRCUIT

Filed Jan. 27, 1967

Inventor:
DONALD H. WILLIS
BY Donald H. Timbie
Attorney

United States Patent Office 3,472,954
Patented Oct. 14, 1969

3,472,954

VIDEO AMPLIFIER TRANSIENT RESPONSE CONTROL CIRCUIT

Donald H. Willis, Indianapolis, Ind., assignor to RCA Corporation, a corporation of Delaware Filed Jan. 27, 1967, Ser. No. 612,186
Int. Cl. H04n 3/16, 5/38
U.S. Cl. 178—7.3 4 Claims

ABSTRACT OF THE DISCLOSURE

One terminal of a source of video signals is coupled to one input electrode of a video amplifier, the other terminal of said source is coupled, at least for the higher video frequencies, via a degenerative resistor to another input electrode of said amplifier, a potentiometer and a capacitor are connected in series in the order named between said latter input electrode and a point on the output circuit of the amplifier, and means are provided for connecting another capacitor between a selected one of a number of points on said potentiometer and said other terminal of said source.

This invention relates to a circuit for controlling the transient response of a television receiver.

It is customary practice to design television receivers in such manner that their overall frequency response is peaked at some high video frequency, usually between 2 and 3 megacycles. The resulting transient response is such as to produce dark lines following an abrupt transition from light to dark and bright lines following a transition from dark to light so that one side of an object may have a dark border and the other side may have a bright border. When a viewer is so far away from the picture that his eye cannot resolve the borders, he is not aware of them, and the picture appears to have more sharply defined edges. However, when the viewer is sufficiently close to the picture that his eye can resolve these dark and light borders, he may find them objectionable.

Accordingly, it is an object of this invention to provide an improved circuit for varying the transient response of a television receiver so that the visibility of their dark and light borders can be changed by the viewer so as to produce a picture that is most pleasing to him at any particular viewing distance.

In designing a television receiver care must be given to maintaining appropriate phase relationships between the various video frequencies.

It is therefore another object of this invention to provide an improved circuit for varying the transient response of a receiver without unduly altering the phase relationships of the various video frequencies.

A circuit arrangement for attaining these objectives in accordance with this invention may be briefly described as follows. One terminal of a source of video signals is coupled to one input electrode of a video amplifier, the other terminal of said source is coupled, at least for the higher video frequencies, via a degenerative resistor to another input electrode of said amplifier, a potentiometer and a capacitor are connected in series in the order named between said latter input electrode and a point on the output circuit of the amplifier, and means are provided for connecting another capacitor between a selected one of a number of points on said potentiometer and said other terminal of said source.

Whereas the invention is defined in the claims, the manner in which it operates to achieve the objectives set forth above will be explained by the following description in conjunction with the drawings in which:

Figure 1:
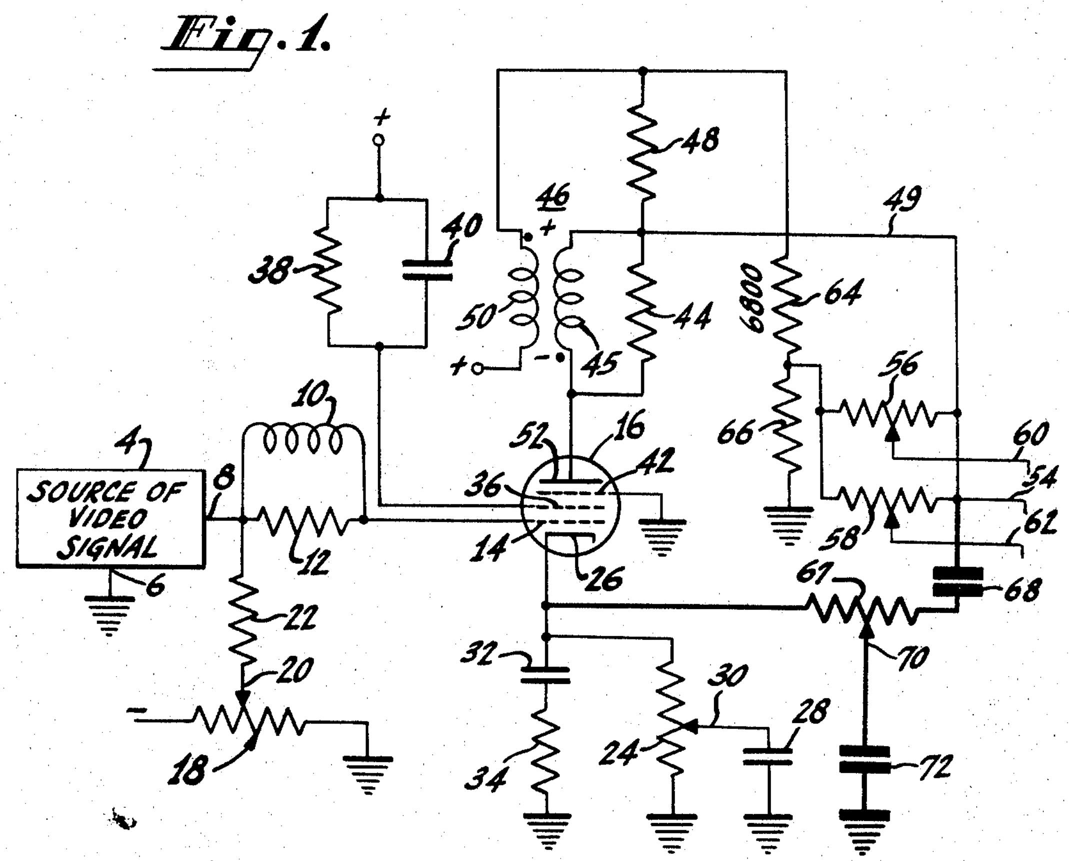
FIGURE 1 is a schematic representation of a video amplifier circuit having a transient responsive control circuit of this invention.

The portion of FIGURE 1 that comprises a typical video amplifier circuit will now be described. A source 4 of video signals, which may be a prior video amplifier circuit, has one output terminal 6 connected to ground and the other output terminal 8 connected via a peaking inductance 10 and a shunt damping resistor 12 to a control grid 14 of an amplifier 16, herein shown as being a pentode. Bias for the grid 14 is provided by a potentiometer 18, one end of which is connected to ground and the other end to a point of negative potential, the tap 20 being connected via a grid leak resistor 22 to one end of the resistor 12. Contrast control for the video amplifier circuit is effected by connection of a potentiometer 24 between the cathode 26 and ground and by connection of a capacitor 28 between the tap 30 and ground. The capacitance of the capacitor 28 is such as to present a low impedance to all video signal components except D.C. Hence these signal components are bypassed around the portion of the resistance of the potentiometer 24 between ground and the tap 30, and the portion of the connection between the tap 30 and the cathode 26 operates to degenerate the signal and reduce their amplitude at the output of the amplifier 16. Thus the source 4 of video signals is coupled to the input electrodes 14 and 26 via a resistive degenerative impedance. High frequencies may be accentuated at the output of the amplifier 16 by a capacitor 32 and a resistor 34 connected in series between the cathode 26 and ground. The screen grid 36 of the pentode amplifier 16 is connected to a point of positive potential via a resistor 38 that sets the desired D.C. operating potential and a parallel signal bypass capacitor 40. The suppressor grid 42 is connected to ground.

Various output circuit configurations may be used for the video amplifier 16, but the particular one shown in FIGURE 1 is comprised of the parallel combination of a resistor 44 and a primary winding 45 of a negative mutual coupling transformer 46 connected in series with an anode load resistor 48 and the secondary winding 50 of the transformer 46 between the anode 52 and a point of positive potential. The junction between the resistors 44 and 48 is connected via a lead 49 to a cathode 54 of a color kinescope, not shown, and to an end of potentiometers 56 and 58 having taps respectively connected to cathodes 60 and 62 of the kinescope. Positive bias voltage for the cathodes 54, 60 and 62 is provided by connection of the other ends of the potentiometers 56 and 58 to a junction between resistors 64 and 66 that are connected in series between ground and the junction of the anode load resistor 48 and the secondary winding 50. Although this type of output circuit has been used in prior receivers and has been described in publications, its operation may be briefly explained as follows. For lower video frequencies the transformer windings 46 and 50 present a low impedance and the coupling between them is small so that the load for the amplifier 16 is essentially comprised of the anode load resistor 48 shunted by the inherent capacitance (not shown) to ground of cathodes 54, 60 and 62 and the circuit comprised of the parallel potentiometers 56, 58 connected in series with the resistor 66. For higher video frequencies the windings 45 and 50 of the transformer 46 effectively comprise, when their winding sense is as indicated, an autotransformer that presents a high matching impedance to the anode 52, and a low impedance at the output lead 49 that is approximately equal to the low impedance presented thereto by the inherent capacitance of the cathodes 54, 60 and 62, the potentiometers 56, 58 and the resistor 66. Because of the better matching of the output impedance of the anode 52 to the input impedance at the cathodes 54, 60 and 62, the voltage for high frequencies as the cathodes is greater than it otherwise would be.

The porton of FIGURE 1 which relates to the transient control circuit of this invention is illustrated by heavier lines and is comprised of a transient response control potentiometer 67 and a capacitor 68 connected in series in the order named between the cathode 26 and the output lead 49. A capacitor 72 having much greater capacitance than the capacitor 68 is connected between the tap 70 and ground.

Figure 2:
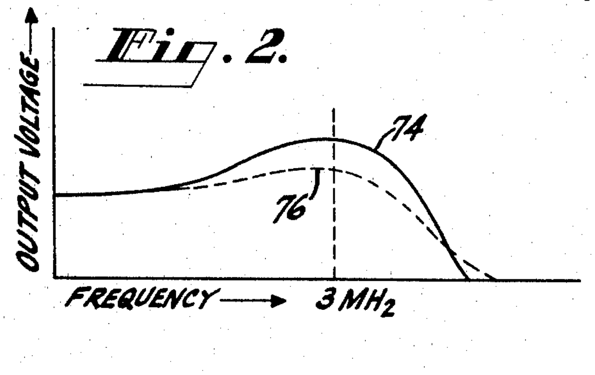
FIGURE 2 is a graphical representation of the effect that the transient control circuit of this invention may have on the response of a video amplifier.

It has been noted that for all but D.C. video signal components the portion of the contrast control potentiometer between its tap 30 and the cathode 26 of the pentode amplifier 16 acts as a degenerative resistive impedance. When the tap 70 of the transient response control potentiometer 67 is at the end nearer the cathode 26, the capacitor 72 is in shunt with the contrast control potentiometer 24 so as to substantially reduce any degenerative effect it might otherwise have for the higher video frequencies. The capacitive loading of the capacitor 68 at the output lead 49 is severely limited by the resistance of the potentiometer 66 that is in series with it so as to produce an overall frequency response characteristic similar to that indicated by the solid curve 74 of FIGURE 2. As the tap 70 is moved away from the cathode 26, more and more resistance of the potentiometer 67 is placed in series between the cathode 26 and the capacitor 72 so that its shunting effect becomes less, thus resulting in more degeneration for the higher video frequencies at the cathode 26. At the same time the resistance between the capacitor 72 and the capacitor 68 becomes less, thus increasing the capacitive loading at the output lead 49. The combined effect is to produce a less peaked frequency response for the video amplifier such as illustrated by the dotted curve 76 of FIGURE 2. Because this response has gentle slopes, the phase relationships between the various video frequencies are not adversely affected.

Figure 3:
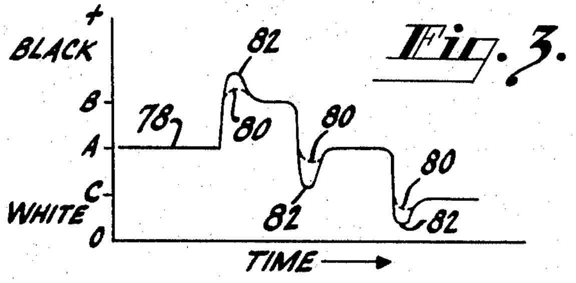
FIGURE 3 is a graphical representation of video signals produced by a video amplifier circuit for two different adjustments of the transient control circuit of this invention.

FIGURE 3 illustrates the effects of the extreme settings of the tap 70 on the signal appearing at the output lead 49 when the input signal at the grid 14 varies between brightness levels A, B, and C with as much rapidity as the previous circuits permit. The solid line 78 represents the signal when the tap 70 is near the cathode 26 so as to produce the peaked frequency response illustrated by the solid curve 74 of FIGURE 2, and the dotted lines 80 illustrate the changes in the signal when the tap 70 is remote from the cathode 26 so as to produce a frequency response such as illustrated by the dotted curve 76 of FIGURE 2. The main effect is to reduce the amplitudes of the transient overshoots 82 so that the dark or bright borders which they produce after each transition from one brightness level to another more nearly correspond to the new brightness level represented by the signal, thus making the lines less visible.

The following is a list of the various circuit parameters which have been found to produce satisfactory results in the circuit of FIGURE 1.

| | | |
|---|---|---|
| R12 | ohms | 2200 |
| R22 | do | 100K |
| R24 | do | 100 |
| R34 | do | 270 |
| R38 | do | 22K |
| R44 | do | 27K |
| R48 | do | 6.8K |
| R56 | do | 6.0K |
| R58 | do | 6.0K |
| R64 | do | 6.8K |
| R66 | do | 39K |
| R67 | do | 30K |
| C32 | pf | 680 |
| C28 | μf | 50 |
| C40 | μf | .22 |
| C58 | pf | 56 |
| C72 | pf | 1200 |
| L10 | μH | 120 |
| Amplifier 16 | | 12HG7 |
| T46 | | ---- |
| Lm (L45 to L46) | μH | 90 |
| L45 | μH | 220 |
| L50 | μH | 260 |

What is claimed is:

1. The combination of:
an amplifier having two input electrodes and an output electrode,
a source of video signal having two output terminals, one of said terminals being coupled to one of said input electrodes,
a first resistor,
means coupling said first resistor between the other output terminal of said source and the other of said input electrodes,
an output circuit connected to said output electrode,
a first capacitor and a second resistor connected in series in the order named between said output circuit and said other input electrode,
a second capacitor, and means for coupling said second capacitor from any of a number of points on said second resistor to a point on said first resistor.

2. The combination of:
an amplifying device having a control grid, a cathode and an anode,
a source of video signals having two output terminals,
means coupling one of said output terminals to a point of reference potential,
means coupling the other of said output terminals to said control grid,
a first resistor,
means coupling at least a portion of said first resistor between said cathode and point of said reference potential,
a point of positive potential,
an output load impedance connected between said point of positive potential said anode,
an output lead connected to a point on said load impedance,
a second resistor and a first capacitor conected in series in the order named between said cathode and said output lead,
a second capacitor, and
means for connecting said second capacitor between a point of said reference potential and any one of a number of points on said second resistor.

3. The combination as set forth in claim 2 wherein:
said output lead is connected to a terminal of a utilization means having an inherent capacitance between it and a point of said reference potential,
said second capacitor having a capacitance that is an order of magnitude or more greater than the capacitance of said first capacitor, and of such absolute value as to have a smaller reactance for higher video frequencies than the resistance of said first resistor, and the combined reactance of said first and second capacitors in series being comparable to or less than the reactance of said inherent capacitance.

4. The combination as set forth in claim 3 wherein said first resistor is a contrast control potentiometer connected between said cathode and a point of said reference potential,
said potentiometer having a moveable tap,
and a bypass capacitor connected between said moveable tap and a point of said reference potential, said bypass capacitor having a capacitance large enough to have a negligible reactance for all video signals except D.C.

References Cited

UNITED STATES PATENTS 2,514,112 7/1950 Wright et al. ---------- 178—7.5

ROBERT L. GRIFFIN, Primary Examiner

R. L. RICHARDSON, Assistant Examiner

U.S. Cl. XR

330—94